H. J. GILBERT.
PULLEY.
APPLICATION FILED MAY 23, 1904.
1,022,840.
Patented Apr. 9, 1912.
2 SHEETS—SHEET 1.
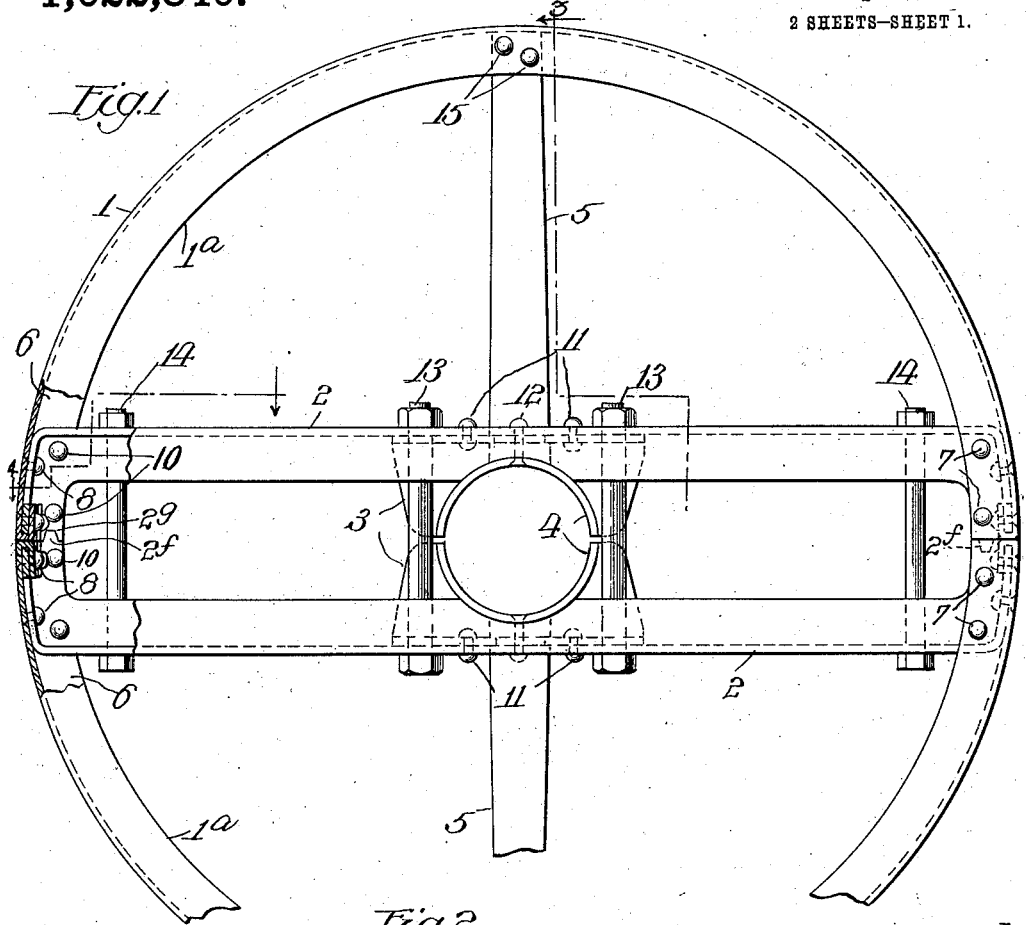
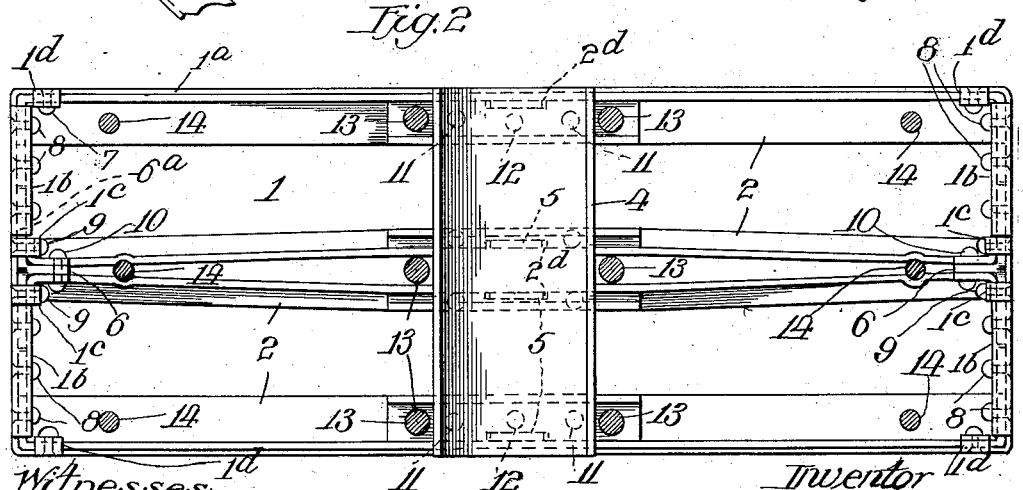
Witnesses:
Edw. R. Barritt
Louis B. Erwin
Inventor
H. J. Gilbert
By Rector & Hibbin
his Atty's.

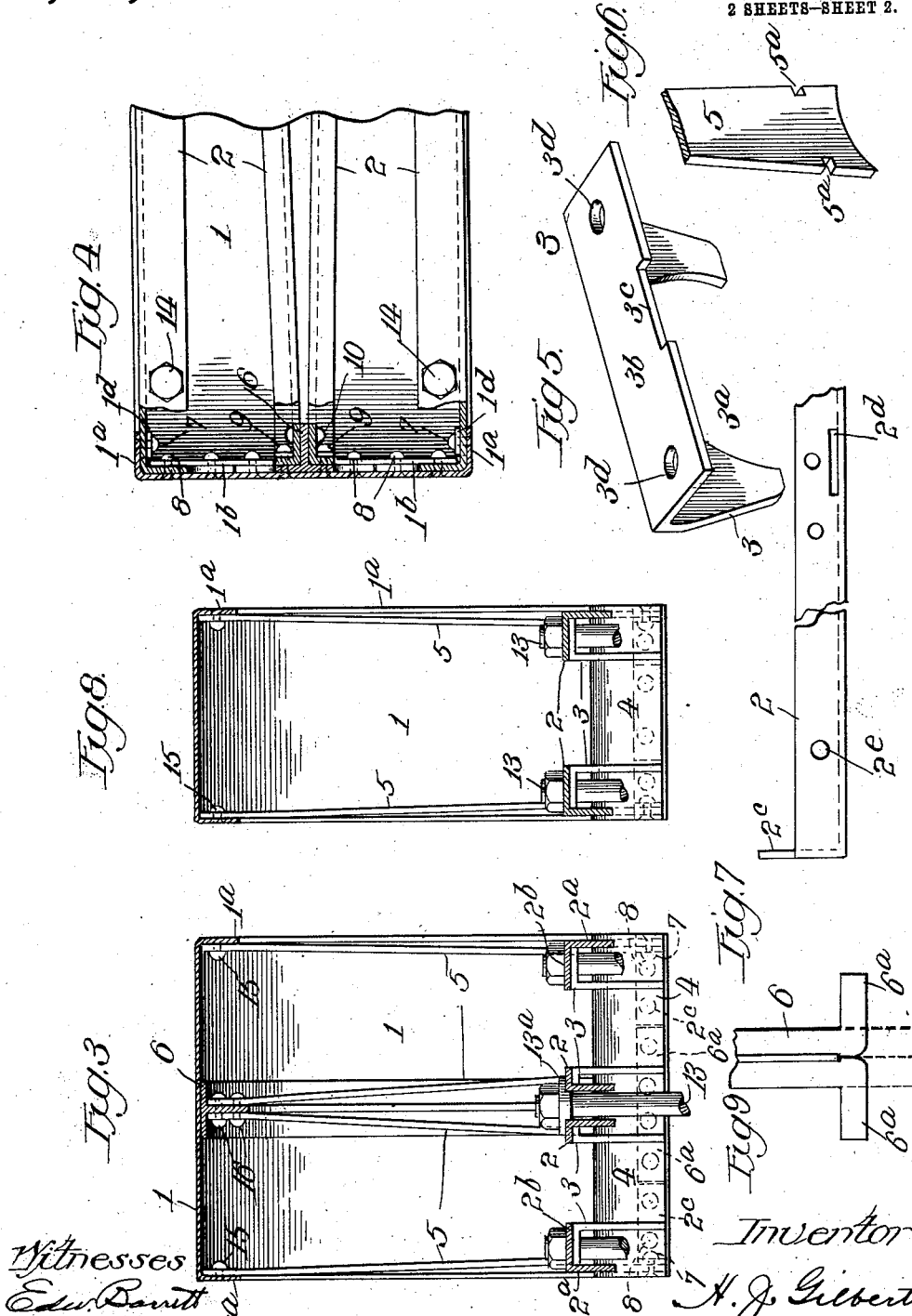
H. J. GILBERT.
PULLEY.
APPLICATION FILED MAY 23, 1904.
1,022,840.
Patented Apr. 9, 1912.
2 SHEETS—SHEET 2.

UNITED STATES PATENT OFFICE.

HENRY J. GILBERT, OF SAGINAW, MICHIGAN.

PULLEY.

1,022,840.  Specification of Letters Patent.  Patented Apr. 9, 1912.

Application filed May 23, 1904. Serial No. 209,335.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention relates to pulleys, more particularly those of the split type, and has for its object the production of a sheet metal pulley which shall be simple and economical of manufacture and durable and efficient in operation.

The principal features of my present invention relate to an improved construction of hub and spoke arms, and a novel form of connection of such arms with the rim.

In the drawings, Figure 1 is a side elevation of a pulley embodying my invention; Fig. 2 a plan view of one of the pulley halves with the clamping bolts in section; Fig. 3 a section on line 3 of Fig. 1; Fig. 4 a section on the irregular line 4 of Fig. 1; Fig. 5 a perspective of one of the hub plates or sections; Fig. 6 a perspective of the lower end of one of the supplemental spoke arms; Fig. 7 a plan view of one of the spoke arms; Fig. 8 a section of one of the pulley halves of a narrow faced pulley, with the central spoke arm structure omitted; and Fig. 9 a detail view of one of the ends of the T-iron.

My present invention represents an improvement or modification of the construction of pulley illustrated in my pending application filed May 23d, 1904, Serial No. 209,334, inasmuch as the spoke arms are composed of angle irons, but the present pulley differs from the pulley of said application as to hub structure and method of connection of the spoke arms with the rim, and also differs in the provision of supplemental spoke arms.

As herein shown, and referring particularly to Figs. 1 to 4, the pulley comprises essentially the rim segments 1, the spoke arms 2 arranged in pairs, and hub plates or sections 3, to which may be added, if desired, the hub thimble 4 and the supplemental spoke arms 5, as comprised in the pulley illustrated in Fig. 1. The number of pairs of spoke arms is dependent upon the width of the pulley or upon the desired strength, as hereinafter made apparent.

The rim segments each comprise a semicircular band of sheet metal of any desired width according to whether the pulley is to be wide or narrow faced, or otherwise, and having inturned peripheral flanges $1^a$ which are radial of the pulley. For a narrow faced pulley as illustrated in Fig. 8, a simple rim with such flanges is sufficient, but for a wider faced pulley or a pulley of considerable diameter a reinforcing member is employed, as seen in Figs. 3 and 4, where such member is a T-iron 6. These flanges and the T-iron constitute the means of connection of the spoke arms to the rim, as hereinafter explained.

In the wider-faced type of pulley illustrated in Figs. 1 to 4, now being described, the spoke arms are arranged in pairs, there being two outer pairs connected with the rim substantially at its edges, and two inner pairs thereof connected with the rim at the central line thereof. In the form of narrower-faced type of pulley illustrated in Fig. 8, the two inner pairs of spoke arms are dispensed with, leaving the two outer pairs thereof as the main spoke structure.

Still referring to the construction of pulley illustrated in Figs. 1 to 4, each spoke arm 2 extends entirely across the pulley, in a plane parallel to the plane dividing the pulley halves and, as herein shown, each arm is composed of an angle iron, which is L-shaped in cross section, comprising two flanges, one of which, marked $2^a$, is radial of the pulley and inwardly directed and the other, marked $2^b$, is arranged at right angles to its companion flanges, as clearly indicated in Fig. 3.

The ends of each spoke arm are bent or folded at substantially right angles, and in the plane of its flange $2^a$, as illustrated in Fig. 1, and, in respect to the two outer pairs of spoke arms, the flange $2^b$ is provided at such ends with a tongue $2^c$ extending laterally and inwardly toward the center line of the pulley, which tongue conforms to the contour of the inner face of the rim and is secured thereto. As shown in Fig. 2, the two inner pairs of spoke arms 2 are similar to the outer pairs thereof with the exception of the tongue $2^c$, which is omitted therefrom.

Referring to the outer pairs of spoke arms, each end of such arms is secured to the inturned flange $1^a$ in suitable manner, as by the rivets 7, and to the rim by rivets 8. The ends of the inner pairs of spoke arms are secured to the rim by the rivets 9 and to the stem or web of the T-iron 6 by the rivets 10.

As indicated more particularly in Figs. 2, 4 and 9, the flanges of each T-iron are, by preference, extended beyond the web or stem thereof, and are centrally split, forming flanges or tongues $6^a$ which are folded in opposite directions at right angles to the body of the T-iron, which tongues are arranged to rest against and be secured to the inner surface of its rim segment from the center line thereof and laterally toward the edges.

By preference, though not of necessity, the ends of the spoke arms as well as of the T-irons are interlocked with the meeting ends of the rim segments and, in addition, the outer pairs of spoke arms are interlocked with the flange $1^a$ of such segments. In the present instance, each of the segments is provided at its opposite ends with tongues which are folded inwardly and backwardly to form sockets or recesses to receive the flanges and tongues of the spoke arms and of the T-irons. Two of such tongues marked $1^b$ receive the flanges $2^b$ and tongues $2^c$ of the outer pairs of spoke arms and the flanges or tongues $6^a$ of the T-iron 6. Two narrow flanges $1^c$ form wider sockets to take in the flanges $2^b$ of the inner pairs of spoke arms. Likewise the flanges $1^a$ of the rim segments are extended as tongues $1^d$ which are folded inwardly and backwardly to form recesses to receive the flanges $2^a$ of the outer pairs of spoke arms. The rivets 7, 8 and 9 also pass through the tongues of the rim in order to secure the parts within their respective sockets or recesses. In this manner and by these means a strong and efficient connection is obtained between the spoke arms and rim.

In addition to the described interlocking of the spoke arms and rim, the spoke arms themselves are, by preference, interlocked, and to this end one end of each spoke has a projection or pin $2^f$ and the other end a recess $2^g$ corresponding in shape to such pin, with the result that when the pulley halves are assembled the pin of each spoke arm may be received by the recess of its companion spoke.

The hub structure carried by the spoke arms 2, as herein shown, comprises a series of hub sections or plates 3, one of which is illustrated in perspective in Fig. 5. Each hub plate has a semi-circular recess $3^a$ whereby it may be fitted or saddled upon the hub thimble 4 or directly upon the shaft itself when a hub thimble or the like is not employed. Each hub section or plate has a right-angled flange $3^b$ which fits beneath the flange $2^b$ of its spoke arm at its middle portion and thereby supports the latter. The spoke arms and hub sections are secured together in suitable manner, as by means of the rivets 11, and in case a hub thimble is used, the same may be held in place by the rivets 12 passing through such spoke arms and hub sections.

The pairs of spoke arms and their associated hub plates are held or clamped upon the shaft by the clamping bolts 13 passing through the spoke arms and hub sections and by the clamping bolts 14 near the outer ends of the spoke arms. However, the outer clamping bolts may be dispensed with in small diameter pulleys.

The supplemental spoke arms 5, hereinbefore mentioned as desirable in some types or sizes of pulley, are flat strips or bars and are positioned at right angles to the main spoke arms and, passing through the side recesses $3^c$ of the hub sections or plates, extend from each spoke arm radially to the rim to which they are connected in suitable manner. The two outer sets of these supplemental spokes are, in the present instance, fastened to the inturned flanges $1^a$ of the rim by rivets 15, while the two inner sets of such supplemental spokes are fastened to the stem or web of the T-iron by rivets 16, all as clearly indicated in Figs. 1 and 3.

The inner end of each supplemental spoke arm 5 is curved to the contour of the hub thimble or of the shaft opening, so as to fit upon the thimble, and for the purpose of readily and efficiently locking such spokes to their respective spoke arms and hub sections I provide for the interlocking of these parts in the following manner: Each spoke arm, near its inner end at the proper point, has opposite side notches $5^a$, as indicated in Fig. 6, the distance between which notches, that is the width of the spoke arm at such point, equals the length of the recess $3^c$ formed on the edge of each hub section or plate, Fig. 5, with the result that after such supplemental spoke arm is inserted through the slot $2^d$ of its spoke arm 2, Fig. 7, and properly positioned in relation thereto, the hub section thereof, when put in position or assembled therewith, will engage the supplemental spoke arm, inasmuch as the edges of the flanges $3^b$ thereof immediately adjacent the recess $3^c$ will enter the notches $5^a$ and thereby effectively hold and lock the spoke 5 in place.

As indicated more particularly in Figs. 2, 3 and 5, the clamping bolts of the outer pairs of main spoke arms 2 pass through bolt holes $2^e$ in such arms and also through bolt holes $3^d$ in the hub sections in respect to the inner set of such clamping bolts, whereas the clamping bolts of the inner pairs of spoke arms 2 are passed through between the two sets of such arms whose radial flanges $2^a$ are arranged adjacent each other. As shown in Fig. 3, the horizontal flanges $2^b$ of these inner pairs of spoke arms 2 need not be as wide as the similar flanges of the outer sets, and likewise the flanges $3^b$ of the hub sections may be correspondingly reduced. The inner set of spoke arms may be separated any desired distance to permit its clamping bolts to pass through and to give support for washers 13ª for such bolts.

As illustrated in Fig. 8, the inner sets of spoke arms, both the sets of arms 2 and 5, may be dispensed with, but in other respects the construction of pulley here shown is the same as that already described, with the exception, of course, that its rim is narrower.

It will be understood that, so far as my broader claims are concerned, the novel construction of spoke arm and hub structure is independent of the particular connection between such arms and the rim, and also that the novel form of connection is independent of the particular hub structure. That is to say, the novel construction of spoke arm and hub may be used in connection with plain rim segments with abutting meeting ends without any provision for interlocking with the spoke arms, and also that the novel spoke and rim connection may be utilized without reference to the particular construction of the hub sections.

Although I have described more or less precise forms and details of construction, I do not intend to be understood as limiting myself thereto, as I contemplate changes in form, proportion of parts, and the substitution of equivalents as circumstances may suggest or render expedient, without departing from the spirit of my invention.

I claim:

1. A pulley comprising rim segments having inturned peripheral flanges, and spoke arms consisting of angle irons composed solely of two flanges interlocked with such peripheral flanges; substantially as described.

2. A pulley comprising rim segments having inturned peripheral flanges, which, at the meeting ends of such segments, are extended and folded back to form sockets, and spoke arms engaged by such sockets; substantially as described.

3. A pulley comprising rim segments having inturned peripheral flanges, which, at the meeting ends of such segments, are extended and folded back to form sockets, and spoke arms consisting of angle irons whose ends are engaged by such sockets; substantially as described.

4. A pulley comprising rim segments having inturned peripheral flanges, which, at the meeting ends of such segments, are extended and folded back to form sockets, and spoke arms consisting of angle irons, one of whose flanges is engaged by such sockets; substantially as described.

5. A pulley comprising rim segments having inturned peripheral flanges, which, at the meeting ends of such segments, are extended and folded back to form sockets, spoke arms consisting of angle irons, one of whose flanges is engaged by such sockets, and rivets passed through such flanges and sockets to secure such parts together; substantially as described.

6. A pulley comprising rim segments having their meeting ends inwardly folded to form sockets, and spoke arms consisting of angle irons having end extensions or tongues 2ᶜ engaged by such sockets; substantially as described.

7. A pulley comprising rim segments having their meeting ends inwardly folded to form sockets, and also having inturned peripheral flanges, and spoke arms consisting of angle irons connected with such flanges and having end tongues 2ᶜ engaged by said sockets; substantially as described.

8. A pulley comprising rim segments having their meeting ends inwardly folded to form sockets, and also having inturned peripheral flanges, whose ends are inturned to form sockets, and spoke arms consisting of angle irons engaged at their ends by the said sockets of the meeting ends and of the flanges of the rim; substantially as described.

9. A pulley comprising rim segments having their meeting ends inwardly folded to form sockets, and also having inturned peripheral flanges, whose ends are inturned to form sockets, and spoke arms consisting of angle irons, one of whose flanges is directed radially toward the center of the pulley and is engaged by the sockets of the rim flanges, said spoke arms being also engaged at their ends by the sockets formed by the meeting ends of the rim; substantially as described.

10. A pulley comprising rim segments having their meeting ends inwardly folded to form sockets, and also having inturned peripheral flanges, whose ends are inturned to form sockets, and spoke arms consisting of angle irons, one of whose flanges is directed radially toward the center of the pulley and is engaged by the sockets of the rim flanges, said spoke arms being provided at their ends with lateral tongues 2ᶜ engaged by the sockets formed by the meeting ends of the rim; substantially as described.

11. A pulley comprising rim segments having inturned peripheral flanges, and a plurality of spoke arms interlocked with said segments and also with its said flanges; substantially as described.

12. A pulley comprising rim segments having inturned peripheral flanges, a plurality of spoke arms consisting of angle irons connected at their ends with said flanges, and a separate set of similarly formed spoke arms connected at their ends with the rim intermediate its flanges; substantially as described.

13. A pulley comprising rim segments having inturned peripheral flanges, a plurality of spoke arms consisting of angle irons connected at their ends with said flanges, said rim being provided with an interior web, and a separate set of similarly formed spoke arms connected at their ends with the rim intermediate its flanges; substantially as described.

14. A pulley comprising rim segments having inturned peripheral flanges, a plurality of spoke arms consisting of angle irons connected at their ends with said flanges, and a separate set of similar spoke arms connected at their ends with the rim intermediate its flanges; substantially as described.

15. A pulley comprising rim segments having inturned peripheral flanges whose extended ends are inturned to form sockets, two outer pairs of spoke arms consisting of angle irons engaged by said sockets, and a separate set of similar spoke arms arranged between said outer pairs of spoke arms and connected at their ends with the rim intermediate its flanges; substantially as described.

16. A pulley comprising rim segments having inturned peripheral flanges whose extended ends are inturned to form sockets, and whose meeting ends are extended to form sockets, two outer pairs of spoke arms consisting of angle irons engaged by said sockets of the flanges, and a separate set of similar spoke arms arranged between said outer pairs of spoke arms and engaged at their ends with the sockets of the rim; substantially as described.

17. A pulley comprising rim segments, main spoke arms consisting of angle irons connected at their ends with the rim segments, and supplemental spoke arms connected at their outer ends with the rim and interlocked at their inner ends with the main spoke arms; substantially as described.

18. A pulley comprising rim segments, main spoke arms consisting of angle irons connected at their ends with such segments, hub sections arranged at the middle portions of such spoke arms, and supplemental spoke arms connected at their outer ends with the rim and passing through the main spoke arms and there engaged by the hub sections; substantially as described.

19. A pulley comprising rim segments, main spoke arms consisting of angle irons connected at their ends with such segments, hub sections arranged at the middle portions of such spoke arms, and secured thereto, and supplemental spoke arms connected at their outer ends with the rim and having their inner ends passed through said main spoke arms and the hub sections, which latter engage and lock the supplemental spoke arms; substantially as described.

20. A pulley comprising rim segments, main spoke arms consisting of angle irons connected at their ends with such segments, hub sections arranged at the middle portions of such spoke arms, and supplemental spoke arms connected at their outer ends with the rim and having their inner ends passed through said main spoke arms and the hub sections, said supplemental spoke arms having notches formed near their inner ends and engaged by said hub sections; substantially as described.

21. A pulley comprising rim segments, main spoke arms consisting of angle irons connected at their ends with such segments, hub sections arranged at the middle portions of such spoke arms, and each comprising a plate 3 having a flange $3^b$ coöperating with one of the angles or flanges of its main spoke arm, said flange having a side recess $3^c$, and each of said main spoke arms having a slot, and supplemental spoke arms connected at their outer ends with the rim and having opposite notches formed near their inner ends, such inner ends being passed through the slots of the spoke arms and said notches being engaged by the recesses $3^c$ of the hub plates; substantially as described.

22. A pulley comprising rim segments, spoke arms connected at their outer ends with the rim segments, and substantially semi-circular T-irons arranged within the segments and having at their meeting ends lateral tongues which rest against the inner face of the segments; substantially as described.

23. A pulley comprising rim segments, spoke arms connected at their outer ends with the rim segments, and substantially semi-circular T-irons arranged within the segments and having their flange portions extended beyond their stem portions and laterally folded against the inner face of the segments; substantially as described.

24. A pulley comprising rim segments, spoke arms connected at their outer ends with the rim segments, and substantially semi-circular T-irons arranged within the segments and having their flange portions extended and divided into two tongues which are folded laterally at right angles to the flange portions and are connected with the rim segments; substantially as described.

25. A pulley comprising rim segments having infolded meeting ends forming sockets, spoke arms connected at their ends with the rim segments, and T-irons arranged within the segments and having lateral tongues or flanges formed at their ends and engaged by said sockets; substantially as described.

26. A pulley comprising rim segments having infolded meeting ends forming sockets, spoke arms connected at their ends with the rim segments, and T-irons arranged within the segments and whose flange portions are extended beyond their stem portions and laterally folded so as to lie within said sockets; substantially as described.

27. A pulley comprising rim segments, spoke arms, and substantially semi-circular T-irons arranged within the segments and having lateral tongues formed at their meeting ends, said rim segments having inturned tongues at their meeting ends forming sockets engaging the tongues of the T-irons and the outer ends of the spoke arms; substantially as described.

28. A pulley comprising rim segments, main spoke arms consisting of angle irons connected at their ends with such segments, hub sections arranged at the middle portions of such spoke arms, and each comprising a plate 3 having a flange $3^b$ coöperating with one of the angles or flanges of its main spoke arm, said flange having a side recess $3^c$, and each of said main spoke arms having a slot, and supplemental spoke arms connected at their outer ends with the rim and having notches $5^a$ formed on opposite edges near their inner ends leaving the width of such spokes at this point equal to the length of the recess $3^c$, such inner ends being passed through said slots of the main spoke arms and their notches $5^a$ being engaged by the recesses $3^c$ of the hub plates or sections; substantially as described.

29. A pulley comprising a rim having inturned peripheral flanges, two sets of spoke arms connected near their outer ends with said rim flanges and having such outer ends extended laterally and inwardly toward the center line of the rim and connected to such rim, and hub sections coöperating with said spoke arms; substantially as described.

30. A pulley comprising rim segments having, at their meeting ends, infolded tongues forming sockets, spoke arms arranged in radial planes corresponding to the edges of said rim segments and having lateral flanges received by said sockets and thereby interlocking with the rim segments, and hub sections coöperating with said spoke arms; substantially as described.

31. A spoke pulley provided with a metal rim having its edges inwardly flanged and provided with spoke-arms having their outer ends formed to seat upon the flanges and also offset in a direction transversely of the rim upon the inner face of the rim and secured in such position.

32. A pulley having a hub, sheet metal spoke-arms arranged with their flat sides facing the sides of the pulley, and a rim provided with flanges at its edges extending inwardly at substantially right angles relative thereto, said spoke-arms being secured at their outer ends to the rim and having straight portions abutting the inner faces of the flanges and ends offset in a direction transverse of the rim underlying the rim.

HENRY J. GILBERT.

Witnesses:
S. E. HIBBEN,
LOUIS B. ERWIN.

Copies of this patent may be obtained for five cents each, by addressing the "Commissioner of Patents, Washington, D. C."